Patented Dec. 31, 1940

2,226,909

UNITED STATES PATENT OFFICE 2,226,909

ANTHRAQUINONE DYESTUFFS AND A PROCESS FOR THEIR MANUFACTURE

Albin Peter, Basel, Switzerland, assignor to Sandoz Ltd., Basel, Switzerland

No Drawing. Application December 23, 1937, Serial No. 181,465. In Germany December 30, 1936

11 Claims. (Cl. 260—374)

The present invention relates to anthraquinone dyestuffs and to a process for their manufacture.

I have found that if anthraquinone compounds of the general formula

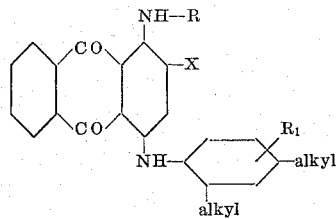

wherein R stands for hydrogen, alkyl or the radical

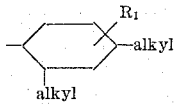

$R_1$ stands for hydrogen or alkyl, and

X represents hydrogen, halogen, alkyl, alkoxy, hydroxyalkoxy or cyano group, are treated with halogenating agents and thereupon, if desired, subjected to a sulphonation operation, valuable water-insoluble or water-soluble anthraquinone derivatives will be obtained.

Under the term "alkyl" cited in the general formula I understand hydrocarbon radicals with one or a plurality of carbon atoms, specific examples of which are the methyl, ethyl, propyl, isopropyl, butyl and isobutyl group. Such hydrocarbon radicals can also be present in the groups "alkoxy" and "hydroxyalkoxy" cited in the general formula. The anthraquinone compounds that I preferably use for carrying out the new process are for example the 1-amino-, 1-methylamino-, 1 - (2':4'- dimethyl) - phenylamino-4 -(2' : 4'- dimethyl) -phenylaminoanthraquinone, 1-amino-2-methyl-, -2-bromo-, -2-cyano-, -2-methoxy-, -2-hydroxyethoxy - 4 -(2': 4'- dimethyl)- phenylaminoanthraquinone and the respective 2':4':5'- and 2':4':6'-trialkyl- derivatives.

As halogenating agents I use the halogens like chlorine and bromine and their derivatives yielding halogen, such as the sulphuryl chloride and -bromide. The halogenation of the above cited compounds can be carried out in presence of convenient promoters such as iodine, sulphur and iron and preferably in a diluting agent or a solvent such as water, sulphuric acid, ethanol, amyl alcohol, glacial acetic acid, toluene, chlorobenzenes and nitrobenzene. The anthraquinone derivatives are if desired first transformed into their salts of halogen acids, for instance by treating them with aqueous or gaseous hydrochloric acid and thereupon treated with the halogenating agents preferably at a low temperature and if desired under cooling in such a manner, that the reaction temperature remains between 0° and 80° C. Generally a dark colored intermediate product becomes first formed, which slowly transposes into the stable halogen compound. This transposition is more rapid if the compound is warmed up on a water bath say up to 100° C.

According to the basicity of the anthraquinone compound and the solvent used, the formed hydrohalogen acid evolves from the reaction mixture or remains dissolved therein. Sometimes it is advantageous to carry out the halogenation of the anthraquinone compounds in presence of acid binding agents such as sodium acetate, sodium bicarbonate and magnesium oxide.

The resulting halogenated product can generally be separated from the reaction mass by simple filtration, but in the cases where a volatile solvent has been used, the same may be first blown off with water steam and the reaction product isolated from the remaining solution. The reaction products are generally obtained in a fairly pure state and can be purified by crystallization or by dissolving them in sulphuric acid and precipitation by means of water. The halogenocompounds thus obtained are insoluble in water and can be used for coloring lacquers and plastic masses. In order to transform them into water-soluble derivatives, the bases obtained as above described are treated at a temperature of —10° to +50° C. with a sulphonating agent, such as sulphuric acid, fuming sulphuric acid or chlorosulphonic acid, or in the case they contain replaceable halogen atoms, they are heated with sulphite according to the well known methods.

The water-soluble anthraquinone compounds obtained in this manner are valuable acid dyestuffs for animal fibres, possessing excellent fastness properties and very brilliant shades.

The water-insoluble and water-soluble dyestuffs obtained according to the present process possess the general formula

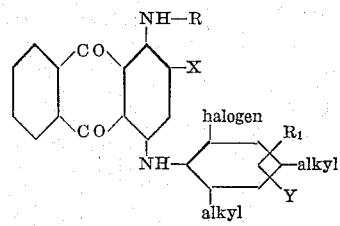

wherein R stands for hydrogen, alkyl or the radical

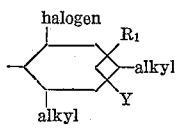

$R_1$ stands for hydrogen or alkyl,
X represents hydrogen, halogen, alkyl, alkoxy, sulphohydroxyalkoxy, sulpho or cyano group, and
Y stands for hydrogen or a sulpho group.

From this general formula it will be clear that for the water-insoluble dyestuffs Y is hydrogen, whereas for the water-soluble dyestuffs Y represents a sulphonic acid group, or hydrogen, when X stands for a sulphohydroxyalkoxy group.

One object of the present invention is, therefore, a process for the manufacture of anthraquinone compounds, comprising the treatment of anthraquinone derivatives of the general formula

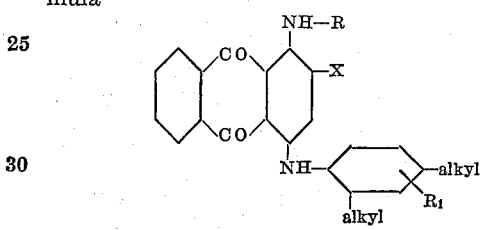

wherein R stands for hydrogen, alkyl or the radical

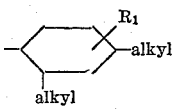

$R_1$ stands for hydrogen or alkyl, and X represents hydrogen, halogen, alkyl, alkoxy, hydroxyalkoxy or cyano group, with halogenating agents, preferably in presence of diluents or solvents and if desired in presence of promoters of the type described.

Another object of the present invention is the process comprising the treatment of the water-insoluble halogenated anthraquinone derivatives prepared as described above with sulphonating agents to transform them into valuable water-soluble compounds.

Still another object of the present invention are the water-insoluble and the water-soluble halogenated anthraquinone compounds prepared as herein substantially described and which are valuable compounds for coloring lacquers, plastic masses and animal fibres in bright fast shades.

The following examples, without being limitative, illustrate the present process, the parts being by weight:

*Example 1*

10 parts of the compound of the formula

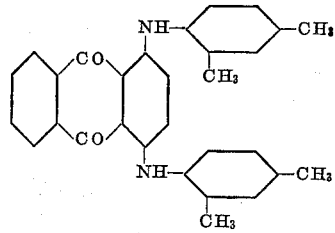

are suspended in 200 parts of chlorobenzene and transformed into its hydrochloride by blowing in a stream of hydrochloric acid. After cooling down to 0°, the mixture is treated at this temperature with 6.8 parts of sulphuryl chloride, dissolved in 10 parts of chlorobenzene. A precipitation of a black-green intermediate product takes place, which becomes transformed on stirring at the room temperature after some hours into the reddish-blue dichloro-compound. The reaction is finished by shortly heating up to 80° C. and the chlorobenzene distilled off by means of water steam.

The base thus obtained can be recrystallized from amyl alcohol. It colors plastic masses into a reddish-blue fast to elevated temperatures.

One part of the base is dissolved in 3 parts of sulphuric acid monohydrate sulphonated with 2 parts of weak fuming sulphuric acid (about 25% of $SO_3$) and at 40° C. The obtained solution is then poured into dilute salt water and worked up in the usual manner. The obtained dyestuff possesses the formula

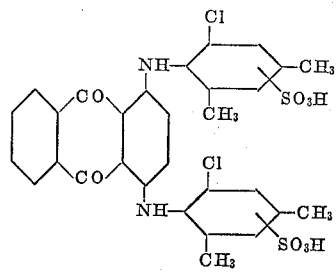

and dyes wool reddish-blue shades of good fastness to milling and to light.

*Example 2*

To a mixture consisting of 10 parts of the compound of the formula

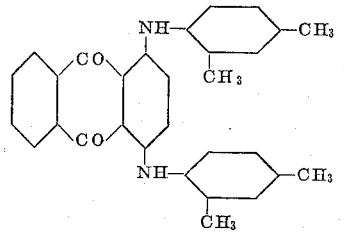

and of 100 parts of chlorobenzene are added under good stirring at 30° C. a mixture consisting of 7.8 parts of bromine and of 20 parts of chlorobenzene. The bromine disappears immediately, but the solution remains green. After heating during 1 hour at 60° C. the solution becomes blue and very fluid. The chlorobenzene is driven off by means of water steam and the reaction product isolated by filtration. The base thus obtained is sulphonated in the same manner as described in Example 1.

The dyestuff thus obtained possesses the formula

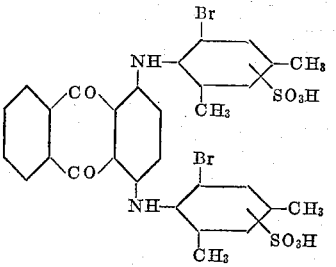

and dyes wool reddish-blue shades of excellent fastness to milling and to acid milling.

Instead of using the bromine solution, one can also use a corresponding quantity of chlorine gas, whereby the dyestuff of Example 1 will be obtained.

*Example 3*

To a suspension of 10 parts of the compound of the formula

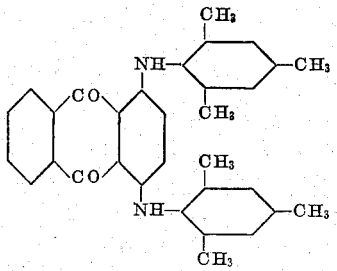

in 100 parts of dichlorobenzene there is added at 60° C. a solution of 7.8 parts of bromine in 15 parts of dichlorobenzene. The temperature is kept during 1 hour at 60° C. and the reaction mixture stirred over night at ordinary temperature. The obtained precipitate is then filtered, washed with ethanol and dried.

The sulphonation is carried out in the same manner as described in Example 1, whereby a dyestuff possessing the formula

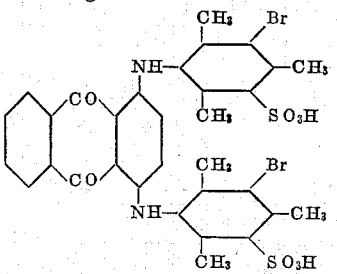

and dyeing animal fibres brilliant reddish blue shades with excellent fastness properties, especially with good fastness to milling and fulling, is obtained.

*Example 4*

10 parts of the compound of the formula

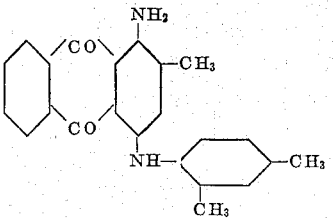

are mixed with 200 parts of chlorobenzene and treated at 20° C. with a solution of 5 parts of bromine in 15 parts of chlorobenzene. The thick mass is then stirred during some hours and heated on the water bath up to about 95° C. The hydrobromide of the brominated base precipitated in form of reddish crystals is then filtered, treated with an aqueous alkali solution and the free base washed and dried.

On sulphonation a dyestuff of the formula

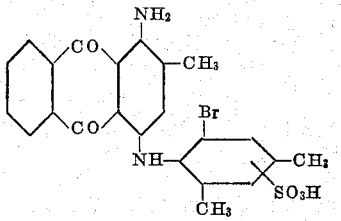

dyeing wool violet shades will be obtained.

If in this example 7 parts of sodium acetate are added to the reaction mixture, no precipitation will be obtained and the brominated product is then isolated by blowing off the solvent.

*Example 5*

10 parts of the compound of the formula

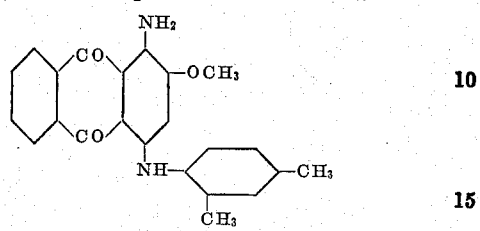

are brominated with 4.8 parts of bromine in the manner described in Example 4, whereby a hydrobromide crystallizing in form of reddish brilliant crystals will be obtained. The free base will be obtained by treating the hydrobromide during 2 hours with 500 parts of water and 10 parts of caustic soda lye of 35% and isolated by filtration.

By sulphonation of this base a dyestuff of the formula

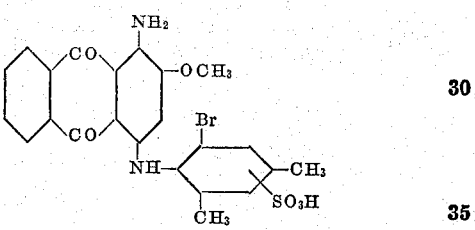

dyeing wool brilliant red-violet shades will be obtained.

*Example 6*

A mixture consisting of 10 parts of the compound of the formula

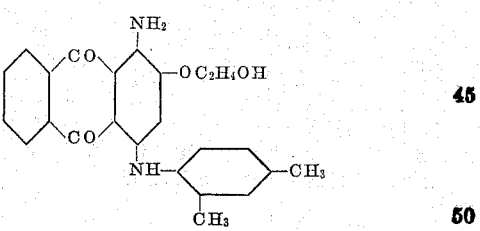

0.1 part of iodine and 100 parts of chlorobenzene is treated at 20° C. with 4.4 parts of bromine. The reaction mixture is stirred over night and thereupon warmed up to 90° C. for a short time. The solvent is then driven off with water steam and the precipitated brominated base filtered, washed and dried. This base can be made water-soluble by esterification with sulphuric acid according to the following method:

1 part of this base is dissolved at 20° C. in 5 parts of sulphuric acid monohydrate and as soon as a test shows, that it became soluble in water, poured on a mixture of ice and salt water. The obtained dyestuff possesses the formula

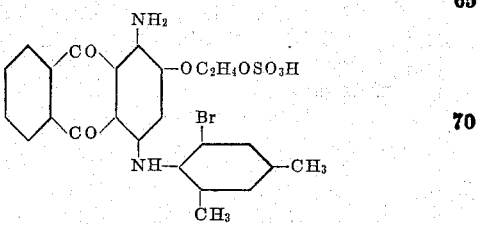

and dyes wool brilliant violet shades fast to light.

Example 7

A suspension of 10 parts of the compound of the formula

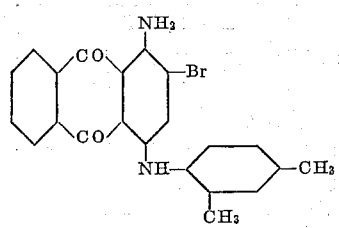

in 100 parts of chlorobenzene is treated with 4.2 parts of bromine and stirred over night. After heating for a short time on the water bath at about 95° C., the chlorobenzene is blown off with water steam and the brominated base filtered, washed and dried.

1 part of this base is dissolved in 4 parts of sulphuric acid monohydrate and treated with 2 parts of weak fuming sulphuric acid and heated during ½ hour at 40° C. When a test taken out shows that the base has become soluble in water, the reaction mixture is poured on ice, the precipitated dyestuff filtered and neutralized. The dyestuff possesses the probable formula

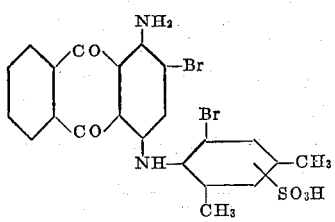

and dyes wool violet shades.

In still wet state the dyestuff is mixed with 1 part of potassium sulphite and 6 parts of water and heated in an autoclave during 16 hours at 140° C. After this treatment the reaction mass is diluted with water, filtered from some insoluble particles and the dyestuff isolated from its solution. It possesses the formula

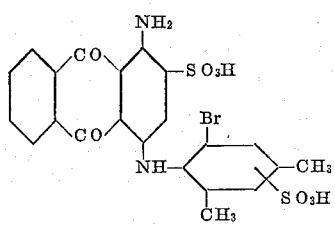

and dyes wool brilliant, very reddish blue shades of excellent fastness to sea-water and to perspiration. The base prepared according to the present example is identical with the base prepared according to the British Patent No. 457,386, sample B, and can, therefore, be transformed into the 2-sulphonic acid derivative by heating with sulphite and phenol.

By replacing 1 - amino - 2 - bromo-4-(2':4'-dimethyl)-phenylaminoanthraquinone by 1-amino-2 - bromo -4 -(2':4':5' - trimethyl), (2':4':6'-trimethyl)-, or (2':4'-dimethyl-6'-ethyl)-phenylaminoanthraquinone, similar compounds with excellent fastness properties will be obtained.

Example 8

10 parts of the compound of the formula

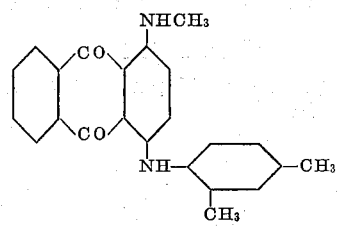

are stirred with 200 parts of amyl alcohol and treated at 20° C. with 5 parts of bromine. The reaction mixture is then stirred over night and warmed up for a short time on the water bath. On cooling down, a precipitation takes place; the precipitate is then filtered off and washed with ethanol and water. One part of the base is then dissolved in 3 parts of sulphuric acid monohydrate and treated with 1 part of weak fuming sulphuric acid at 35° C., until a test shows that the product became soluble in water. The reaction mass is then stirred on ice-water and the dyestuff isolated in the usual manner.

The dyestuff thus obtained possesses the formula

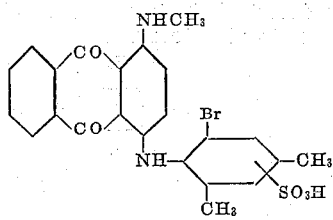

and dyes wool reddish-blue shades.

The bromination can also be carried out in glacial acetic acid. In similar way a violet dyestuff is obtained by brominating 1-amino-4-(2':4'-dimethyl)-phenylaminoanthraquinone.

What I claim is:

1. A process for the manufacture of anthraquinone compounds, comprising the introduction of halogen into the phenyl radical in ortho-position to the secondary amino group by treatment with a halogenating agent of an anthraquinone derivative of the general formula

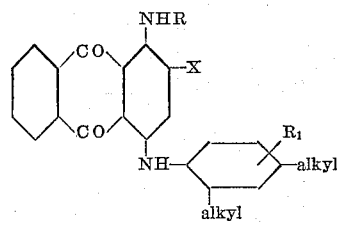

wherein R stands for one of the group consisting of hydrogen, alkyl and the radical

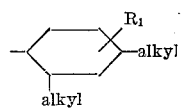

$R_1$ stands for one of the group consisting of hydrogen and alkyl, and

X represents a substituent selected from the group consisting of hydrogen, halogen, alkyl, alkoxy, hydroxyalkoxy and cyano group, and treating the base thus obtained with a sulphonating agent.

2. A process for the manufacture of anthraquinone compounds, comprising the introduction of halogen into the phenyl radical in ortho-position to the secondary amino group by treatment with a halogenating agent in presence of a diluent selected from the group consisting of water, sulphuric acid, glacial acetic acid, ethanol, amyl alcohol, toluene, chlorobenzenes and nitrobenzene, of an anthraquinone derivative of the general formula

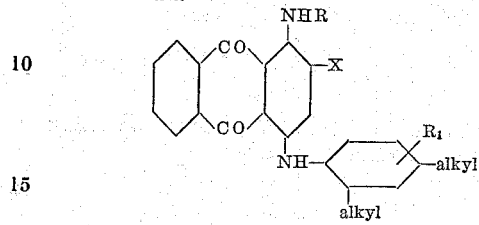

wherein R stands for one of the group consisting of hydrogen, alkyl and the radical

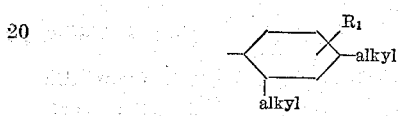

R₁ stands for one of the group consisting of hydrogen and alkyl, and

X represents a substituent selected from the group consisting of hydrogen, halogen, alkyl, alkoxy, hydroxyalkoxy and cyano group, and treating the base thus obtained with a sulphonating agent.

3. A process for the manufacture of anthraquinone compounds, comprising the introduction of halogen into the phenyl radical in ortho-position to the secondary amino group by treatment with a halogenating agent in presence of a diluent selected from the group consisting of water, sulphuric acid, glacial acetic acid, ethanol, amyl alcohol, toluene, chlorobenzenes and nitrobenzene, and in presence of a promoter selected from the group consisting of iodine, iron and sulphur, of an anthraquinone compound of the general formula

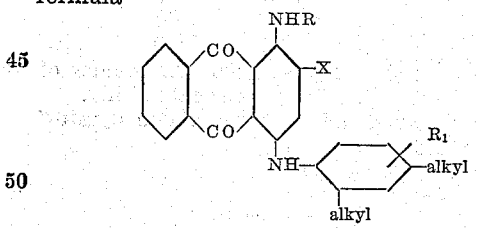

wherein R stands for one of the group consisting of hydrogen, alkyl and the radical

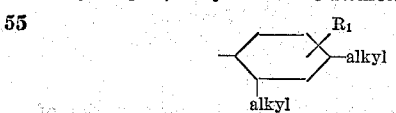

R₁ stands for one of the group consisting of hydrogen and alkyl, and

X represents a substituent selected from the group consisting of hydrogen, halogen, alkyl, alkoxy, hydroxyalkoxy and cyano group.

and treating the base thus obtained with a sulphonating agent.

4. A process for the manufacture of anthraquinone compounds, comprising the introduction of halogen into the phenyl radical in ortho-position to the secondary amino group by treatment with a halogenating agent selected from the group consisting of chlorine and bromine and at a temperature of 0°–80° C. in presence of a diluent selected from the group consisting of water, sulphuric acid, glacial acetic acid, ethanol, amyl alcohol, toluene, chlorobenzenes, and nitrobenzene, and in presence of a promoter selected from the group consisting of iodine, iron and sulphur, of an anthraquinone compound of the general formula

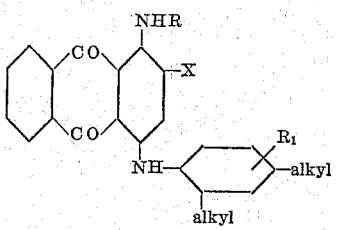

wherein R stands for one of the group consisting of hydrogen, alkyl and the radical

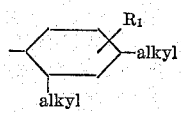

R₁ stands for one of the group consisting of hydrogen and alkyl, and

X represents a substituent selected from the group consisting of hydrogen, halogen, alkyl, alkoxy, hydroxyalkoxy and cyano group, and treating the base thus obtained with a sulphonating agent.

5. A process for the manufacture of anthraquinone compounds, comprising the introduction of halogen into the phenyl radical in ortho-position to the secondary amino group by treatment with a halogenating agent selected from the group consisting of chlorine and bromine and at a temperature of 0°–80° C. in presence of a diluent selected from the group consisting of water, sulphuric acid, glacial acetic acid, ethanol, amyl alcohol, toluene, chlorobenzenes, and nitrobenzene, and in presence of a promoter selected from the group consisting of iodine, iron and sulphur, of an anthraquinone compound of the general formula

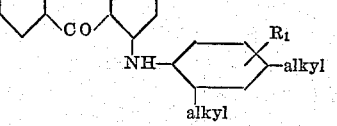

wherein R stands for one of the group consisting of hydrogen, alkyl and the radical

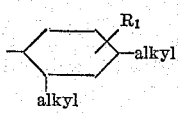

R₁ stands for one of the group consisting of hydrogen and alkyl, and

X represents a substituent selected from the group consisting of hydrogen, halogen, alkyl, alkoxy, hydroxyalkoxy and cyano group, and treating the product obtained with a sulphonating agent at a temperature of −10° to +50° C.

6. A process for the manufacture of an anthraquinone compound, comprising the introduction of bromine atoms into the phenyl radicals in ortho-position to the secondary amino group by treatment with bromine at 30° to 60° C. in presence of chlorobenzene of the compound of the formula

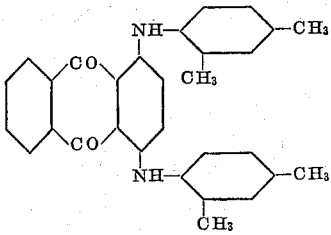

and subsequent sulphonation of the halogenated base thus obtained with fuming sulphuric acid at a temperature of about 40° C.

7. A process for the manfacture of an anthraquinone compound, comprising the introduction of chlorine atoms into the phenyl radicals in ortho-position to the secondary amino groups by treatment with sulphuryl chloride at 30° to 60° C. in presence of chlorobenzene of the compound of the formula

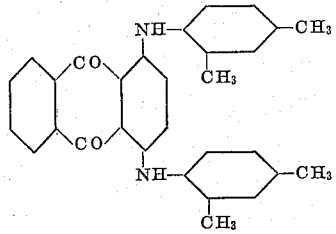

and subsequent sulphonation of the halogenated base thus obtained with fuming sulphuric acid at a temperature of about 40° C.

8. A process for the manufacture of an anthraquinone compound, comprising the introduction of one bromine atom into the phenyl radical in ortho-position to the secondary amino group by treatment with bromine at 20° to 90° C. in presence of iodine and chlorobenzene of the compound of the formula

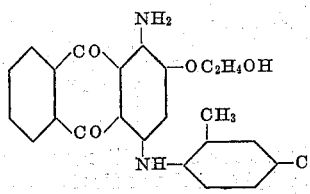

and subsequent sulphonation of the halogenated base thus obtained with sulphuric acid at about 20° C.

9. The halogenated water-soluble anthraquinone dyestuffs of the general formula

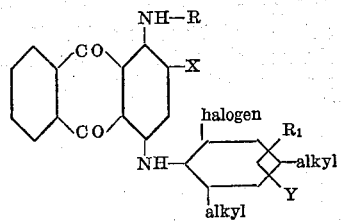

wherein R stands for one of the group consisting of hydrogen, alkyl and the radical

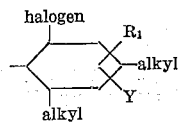

$R_1$ stands for one of the group consisting of hydrogen and alkyl,

X represents a substituent selected from the group consisting of hydrogen, halogen, alkyl, alkoxy, sulphohydroxy-alkoxy, sulpho and cyano group, and Y stands for one of the group consisting of hydrogen and sulpho, and wherein at least one sulpho group must be present in the molecule, which are valuable compounds for dyeing animal fibres violet to blue shades of good fastness properties.

10. The water-soluble anthraquinone dyestuff of the formula

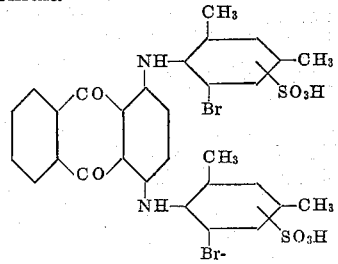

which dyes animal fibres reddish-blue shades of excellent fastness to milling and acid milling.

11. The water-soluble anthraquinone dyestuff of the formula

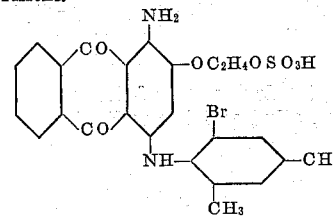

which dyes animal fibres brilliant violet shades of good fastness to light.

ALBIN PETER.